United States Patent
Abouelleil

(10) Patent No.: US 10,267,424 B2
(45) Date of Patent: Apr. 23, 2019

(54) BUTTERFLY VALVE SEAT WITH SEAT COVER

(71) Applicant: Mueller International, LLC, Atlanta, GA (US)

(72) Inventor: Ashraf Abouelleil, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/042,205

(22) Filed: Feb. 12, 2016

(65) Prior Publication Data

US 2017/0234436 A1 Aug. 17, 2017

(51) Int. Cl.
*F16K 1/226* (2006.01)
*F16K 27/02* (2006.01)

(52) U.S. Cl.
CPC .......... *F16K 1/2263* (2013.01); *F16K 1/2265* (2013.01); *F16K 27/02* (2013.01); *F16K 27/0218* (2013.01)

(58) Field of Classification Search
CPC ....... F16K 1/2263; F16K 1/2265; F16K 27/02
USPC .................................................. 251/305–306
See application file for complete search history.

(56) References Cited

U.S. PATENT DOCUMENTS

| | | | |
|---|---|---|---|
| 2,923,524 A | 2/1960 | Fawkes | |
| 3,173,650 A * | 3/1965 | Cotterman | F16K 1/2265 251/288 |
| 3,241,806 A | 3/1966 | Snell | |
| 3,420,498 A | 1/1969 | Housworth | |
| 3,633,872 A | 1/1972 | Wright | |
| 3,647,180 A | 3/1972 | Church | |
| 3,727,883 A | 4/1973 | Conners | |
| 3,771,764 A * | 11/1973 | Miyauchi | F16K 1/2263 249/107 |
| 3,884,266 A | 5/1975 | Kondo | |

(Continued)

FOREIGN PATENT DOCUMENTS

| | | |
|---|---|---|
| GB | 1574489 | 9/1980 |
| JP | H11218235 | 8/1999 |

(Continued)

OTHER PUBLICATIONS

Abouelleil, Ashraf; Applicant Initiated Interview Summary for U.S. Appl. No. 14/573,287, filed Dec. 17, 2014, dated Jun. 23, 2016, 3 pgs.

(Continued)

*Primary Examiner* — Marina A Tietjen
(74) *Attorney, Agent, or Firm* — Taylor English Duma LLP

(57) ABSTRACT

A valve assembly can include a valve body, a seat, and a seat cover. In one aspect, the valve body can include an inner surface and an outer surface. The inner surface can define a body bore and a valve body groove having a bottom groove surface. The seat can include an inner surface defining a seat bore and an outer surface defining a seat alignment rib configured to be positioned in the valve body groove. In one aspect, the valve body groove can define a deformation gap between the bottom groove surface and an outer surface of the seat alignment rib. The seat cover can include an inner surface defining a seat cover bore. In one aspect, the seat cover can be mounted on the seat with an outer surface of the seat cover facing the inner surface of the seat.

21 Claims, 11 Drawing Sheets

(56) References Cited

U.S. PATENT DOCUMENTS

| | | | |
|---|---|---|---|
| 4,006,882 A * | 2/1977 | Bonafous | F16K 1/2265 251/306 |
| 4,025,050 A * | 5/1977 | Manki | F16K 1/2265 251/306 |
| 4,113,268 A | 9/1978 | Simmons et al. | |
| 4,227,675 A | 10/1980 | Sutter et al. | |
| 4,266,754 A | 5/1981 | Ninomiya | |
| 4,418,889 A | 12/1983 | Krause | |
| 4,516,597 A | 5/1985 | Ueda | |
| 5,150,731 A | 9/1992 | Jiro | |
| 5,152,501 A | 10/1992 | Raymond, Jr. | |
| 5,707,040 A | 1/1998 | Gasaway | |
| 5,871,203 A | 2/1999 | Gasaway | |
| 5,918,857 A * | 7/1999 | Wattignier | F16K 1/2263 251/305 |
| 5,975,494 A | 11/1999 | Gasaway | |
| 6,361,051 B1 | 3/2002 | Babin | |
| 6,926,007 B2 | 8/2005 | Frank | |
| 7,090,193 B2 * | 8/2006 | Kamesawa | F16K 1/221 251/305 |
| 7,201,182 B2 | 4/2007 | Eernisse | |
| 7,621,292 B2 | 11/2009 | Eernisse | |
| 7,963,503 B2 | 6/2011 | Day | |
| 8,336,854 B2 | 12/2012 | Cassina | |
| 8,348,236 B2 | 1/2013 | Stefani et al. | |
| 8,430,113 B2 * | 4/2013 | Suetome | B29C 45/1459 137/15.25 |
| 8,857,792 B2 | 10/2014 | Parrie et al. | |
| 8,899,257 B2 | 12/2014 | Grimwade et al. | |
| 2003/0209683 A1 | 11/2003 | Chi-Lung | |
| 2005/0184267 A1 | 8/2005 | Kamesawa | |
| 2011/0166255 A1 | 7/2011 | Noguchi et al. | |
| 2015/0053880 A1 | 2/2015 | Jackson | |
| 2015/0258730 A1 | 9/2015 | Lee | |
| 2018/0149278 A1 | 5/2018 | Abouelleil et al. | |

FOREIGN PATENT DOCUMENTS

| | | |
|---|---|---|
| WO | 2017139038 | 8/2017 |
| WO | 2018102072 | 6/2018 |

OTHER PUBLICATIONS

Abouelleil, Ashraf; Non-Final Office Action for U.S. Appl. No. 14/573,287, filed Dec. 17, 2014, dated May 27, 2016, 21 pgs.

Abouelleil, Ashraf; Advisory Action for U.S. Appl. No. 14/573,287, filed Dec. 17, 2014, dated Jan. 10, 2017, 3 pgs.

Abouelleil, Ashraf; International Search Report and Written Opinion for PCT Application No. PCT/US16/68689, filed Dec. 27, 2016, dated Mar. 17, 2017, 15 pgs.

Abouelleil, Ashraf; Applicant Initiated Interview Summary for U.S. Appl. No. 14/573,287, filed Dec. 17, 2014, dated Aug. 11, 2016, 3 pgs.

Abouelleil, Ashraf; Final Office Action for U.S. Appl. No. 14/573,287, filed Dec. 17, 2014, dated Nov. 8, 2016, 16 pgs.

Abouelleil, Ashraf; U.S. Patent Application entitled: Valve Body and Seat With Tongue and Groove Connection having U.S. Appl. No. 14/573,287, filed Dec. 17, 2014, 50 pgs.

Abouelleil, Ashraf; PCT Application entitled: Valve Body and Seat with Tongue and Groove Connection, having serial No. PCT/US15/59514, filed Nov. 6, 2015, 48 pgs.

Abouelleil, Ashraf; International Search Report and Written Opinion for serial No. PCT/US15/59514, filed Nov. 6, 2015, dated Mar. 2, 2016, 8 pgs.

Abouelleil, Ashraf; International Preliminary Report on Patentability for Application Serial No. PCT/US15/59514, filed Nov. 6, 2015, dated Jun. 29, 2017, 7 pgs.

Abouelleil, Ashraf; Applicant Initiated Interview Summary for U.S. Appl. No. 14/573,287, filed Dec. 17, 2014, dated May 8, 2017, 3 pgs.

Abouelleil, Ashraf; Non-final Office Action for U.S. Appl. No. 14/573,287, filed Dec. 17, 2014, dated Apr. 3, 2017, 15 pgs.

Abouelleil, Ashraf; Final Office Action for U.S. Appl. No. 14/573,287, filed Dec. 17, 2017, dated Oct. 3, 2017, 26 pgs.

Abouelleil, Ashraf; Applicant-Initiated Interview Summary for U.S. Appl. No. 14/573,287, filed Dec. 17, 2014, dated Mar. 14, 2018, 3 pgs.

Abouelleil, Ashraf; Non-Final Office Action for U.S. Appl. No. 14/573,287, filed Feb. 17, 2017, dated Jan. 12, 2018, 25 pgs.

Abouelleil, Ashraf; International Search Report for PCT Application No. PCT/US17/59926, filed Nov. 3, 2017, dated Jan. 19, 2018, 8 pgs.

Abouelleil, Ashraf; Final Office Action for U.S. Appl. No. 14/573,287, filed Dec. 17, 2014, dated May 14, 2018, 30 pgs.

Abouelleil, Ashraf; Requirement for Restriction/Election for U.S. Appl. No. 15/363,410, filed Nov. 19, 2016, dated Jun. 29, 2018, 6 pgs.

Abouelleil, Ashraf; International Preliminary Report on Patentability for PCT Application No. PCT/US2016/068689, filed Dec. 27, 2016, dated Aug. 23, 2018, 14 pgs.

Abouelleil, Ashraf; Non-Final Office Action for U.S. Appl. No. 15/363,410, filed Nov. 29, 2016, dated Oct. 4, 2018, 42 pgs.

* cited by examiner

BUTTERFLY VALVE SEAT WITH SEAT COVER

BACKGROUND

Field

This application relates generally to valve assemblies. More particularly, embodiments of the subject matter to valve bodies and seats of butterfly valve assemblies.

Background Technology

Valves and valve assemblies can be used for controlling or otherwise regulating the flow of a fluid, such as water, through various types of passageways by opening, closing, or partially obstructing the various passageways. A butterfly valve is a specific type of valve assembly that conventionally can comprise a valve body, a seat defining a seating surface, and a disc that is rotatable within the valve body between an open position, at which fluid can flow through the valve body, and a closed position, at which fluid is obstructed from flowing through the valve body. In the closed position, the disc can engage the seat to form a seal to stop the flow of fluid through the valve body. However, in various applications, cycling of the valve between the open and closed positions can cause seat movement is a radial direction and an axial direction of the butterfly valve and can deform the seat from its original shape. Additionally, although a seal can be formed between the disc and the seat, leak lines can form between the seat and the valve body.

SUMMARY

Described herein is a valve assembly and a method of manufacturing the valve assembly. The valve assembly is configured for use with fluid systems to control the flow of fluid through the valve assembly.

In one aspect, the valve assembly can comprise a valve body. The valve body can comprise an inner surface and an outer surface. The inner surface can define a body bore. In one aspect, the valve body can have an inward front ridge and an inward back ridge distal from the inward front ridge. The inner surface can define a valve body groove between the inward front ridge and the inward back ridge, and the valve body groove can have a bottom groove surface.

In another aspect, the valve assembly can comprise a seat. The seat can comprise a front side, a back side distal from the front side, an inner surface, and an outer surface. The inner surface can define a seat bore and the outer surface can define a seat alignment rib extending outward in a radial direction from the outer surface between the front side and the back side. The seat alignment rib can comprise an outer surface. In one aspect, the seat can be mounted on the valve body with the outer surface of the seat facing the inner surface of the valve body and with the seat alignment rib positioned in the valve body groove. In another aspect, the valve body groove can define a deformation gap between the bottom groove surface and the outer surface of the seat alignment rib.

In yet another aspect, the valve assembly can comprise a seat cover. The seat cover can comprise a front side, a back side distal from the front side, an inner surface, and an outer surface. The inner surface can define a seat cover bore. In one aspect, the seat cover can be mounted on the seat with the outer surface of the seat cover facing the inner surface of the seat In another aspect, a seat assembly can comprise the seat and the seat cover. In one aspect, the seat can comprise a front side and a back side distal from the front side. The outer surface and the inner surface of the seat can extend from the front side to the back side. In one aspect, the outer surface can define a seat alignment rib extending outward in a radial direction from the outer surface between the front side and the back side.

In yet another aspect, the method can comprise forming the valve body. In another aspect, the method can comprise forming the seat. In yet another aspect, the method can comprise mounting the seat cover on the seat with the seat within a seat cover groove defined by the seat cover. In one aspect, the method can comprise positioning the seat and seat cover at least partially within the valve body bore. In another aspect, the method can comprise positioning the seat alignment rib into the valve body groove to define a deformation gap between the bottom groove surface and the outer surface of the seat alignment rib.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
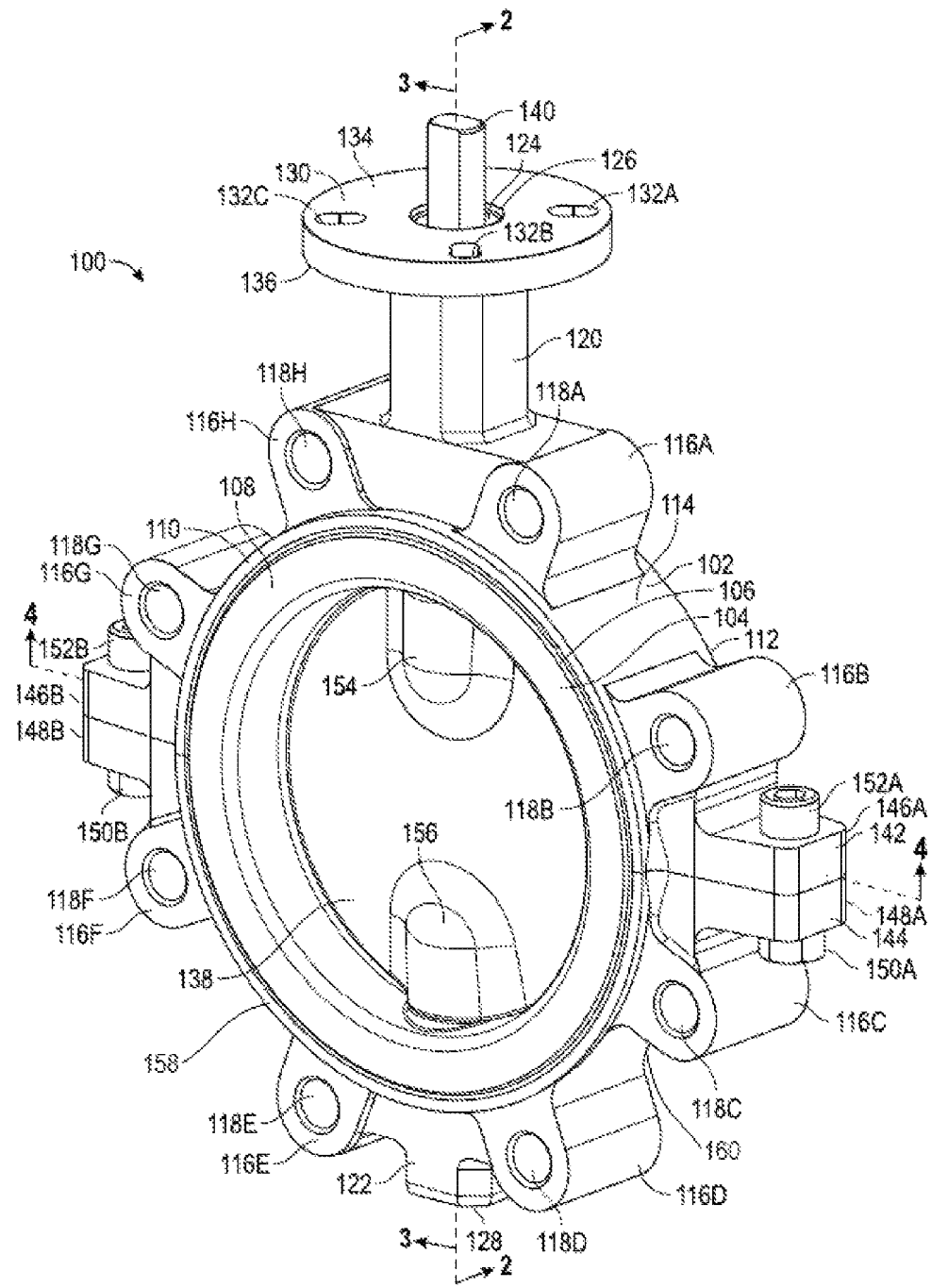
FIG. 1 is a perspective view of a valve assembly comprising a valve body and a seat assembly in accordance with one aspect of the current disclosure.

The present invention can be understood more readily by reference to the following detailed description, examples, drawings, and claims, and the previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a band" can include two or more such bands unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment. Directional references such as "up," "down," "top," "left," "right," "front," "back," and "corners," among others are intended to refer to the orientation as illustrated and described in the figure (or figures) to which the components and directions are referencing.

In one aspect, disclosed is a valve assembly and associated methods, systems, devices, and various apparatus. The valve assembly can comprise valve body and a seat assembly. In one aspect, the seat assembly can comprise a seat and a seat cover. It would be understood by one of skill in the art that the disclosed valve assembly and seat assembly are described in but a few exemplary aspects among many.

As shown in FIG. 1, a valve assembly 100 can comprise a valve body 102 and a seat assembly 104. In one aspect, it is contemplated that the seat assembly 104 can comprise a seat 106 and a seat cover 108. It is contemplated that the valve assembly 100 can be a butterfly valve assembly; however, it is also contemplated that the valve assembly can be other types of valve assemblies that can utilize the seat assembly 104 comprising the seat 106 and the seat cover 108. It is contemplated that the valve body 102 can be constructed from materials including, but not limited to, ductile iron, cast iron, cast bronze, stainless steel, carbon steel, aluminum, plastic, or any other suitable material.

Figure 2:
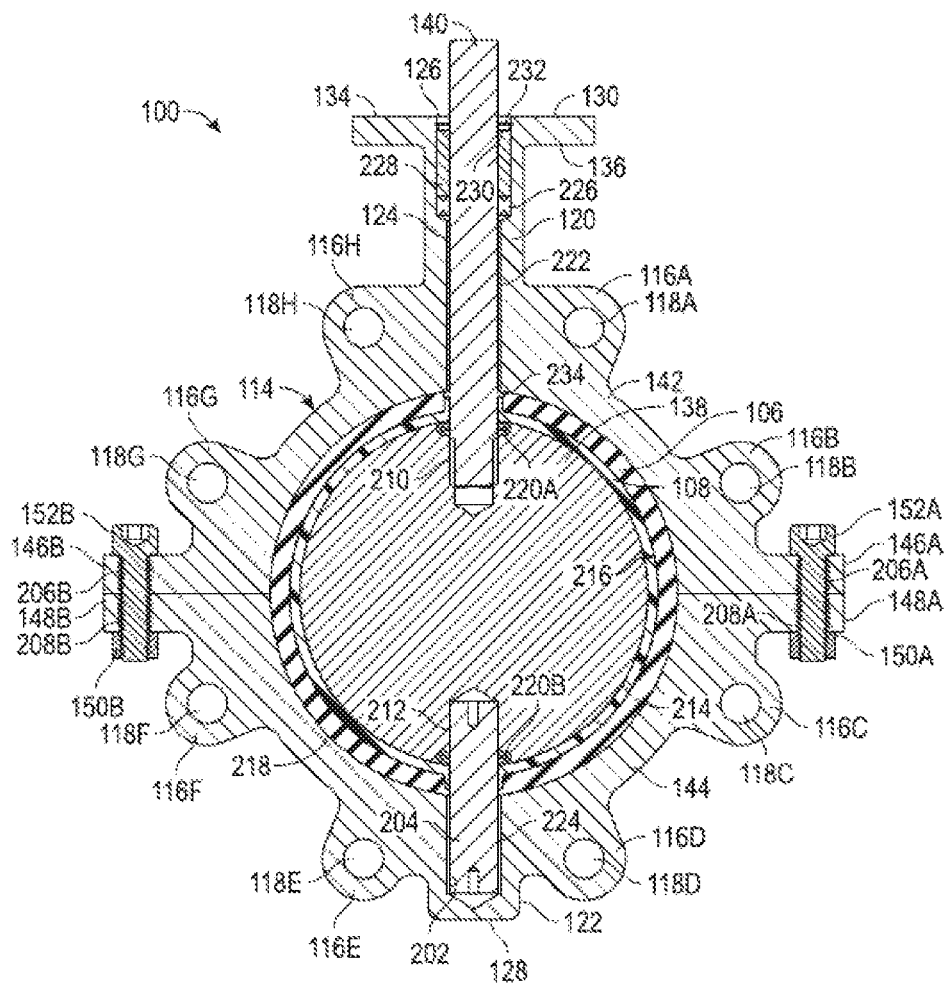
FIG. 2 is a sectional view of the valve assembly of FIG. 1 taken along line 2-2 in FIG. 1.
Figure 3:
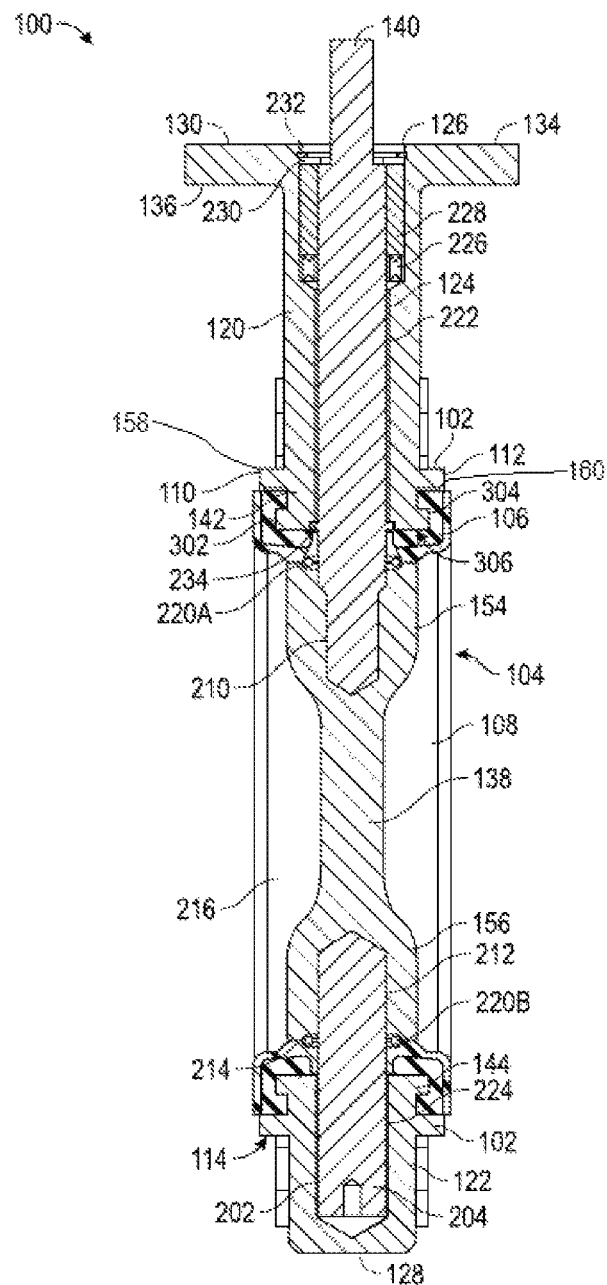
FIG. 3 is a sectional view of the valve assembly of FIG. 1 taken along line 3-3 in FIG. 1.

In one aspect, the valve body 102 can comprise an outward front ridge 110 and an outward back ridge 112 distal from the outward front ridge 110. The valve body 102 can define an outer surface 114 extending between the outward front ridge 110 and the outward back ridge 112. Referring to FIG. 3, in another aspect, the valve body 102 can comprise an inward front ridge 302 and an inward back ridge 304 distal from the inward front ridge 302. The outward front ridge 110 and the inward front ridge 302 can be at a front side 158 of the valve body 102. The outward back ridge 112 and the inward back ridge 304 can be at a back side 160 of the valve body 102. Optionally, a distance from the inward front ridge 302 to the inward back ridge 304 can be less than a distance from the outward front ridge 110 to the outward back ridge 112. The valve body 102 can define an inner surface 306. The inner surface 306 can define a body bore 218 (shown in FIG. 2) extending through the valve body 102 from the inward front ridge 302 to the inward back ridge 304. Optionally, the valve body 102 is annular such that the inner surface 306 defines a substantially cylindrical body bore 218. One skilled in the art will appreciated that other geometric shapes of the valve body 102, inner surface 306, and body bore 218 can be present.

Referring to FIG. 1, the valve body 102 optionally can comprise lugs 116A-H extending radially outwards from the outer surface 114. Each lug 116A-H can define an alignment bore 118A-H, respectively. It is contemplated that the lugs 116 and alignment bores 118 can allow the valve assembly 100 to be positioned and secured between two pipe elements (not shown) of a pipe system (not shown). For example and without limitation, bolts (not shown) can be passed through the alignment bores 118 and complementary bores in the pipe elements to secure the valve assembly 100 between the two pipe elements. It will be appreciated that the number of lugs 116 and alignment bores 118 should not be considered limiting on the current disclosure as it is also contemplated that any desired number lugs 116 and alignment bores 118 can be utilized, including zero lugs 116 and alignment bores 118, and other known securing mechanisms can be used to secure the valve assembly 100 to the two pipe elements instead.

Optionally, the valve body 102 can comprise an upper neck 120 and a lower neck 122, each extending radially outwards from the outer surface 114. In one aspect, the upper neck 120 can extend from the outer surface 114 at a position opposite from the location of the lower neck 122 on the outer surface 114. The upper neck 120 can define an upper neck bore 124 that extends from a top end 126 of the upper neck 120 through the upper neck 120 and the valve body 102 to the inner surface 306 of the valve body 102. The upper neck bore 124 can be dimensioned to accept an upper stem 140 of the valve assembly 100 and enable the upper stem 140 to rotate, as described in greater detail below. In a similar manner, the lower neck 122 can define a lower neck bore 202, as shown in FIG. 2. In one aspect, it is contemplated that the lower neck bore 202 can be defined partially through the lower neck 122 to the inner surface 306 of the valve body 102. However, it is also contemplated that in other aspects, the lower neck bore 202 can be defined from a bottom end 128 of the lower neck 122 to the inner surface 306 of the valve body 102. In these aspects, the valve assembly 100 optionally can comprise a lower neck cap (not shown) that can cover the lower neck bore 202 at the bottom end 128. The lower neck bore 202 can be dimensioned to accept a lower stem 204 (shown in FIG. 2) and enable to lower stem 204 to rotate, as described in greater detail below. The upper neck bore 124 and the lower neck bore 202 can optionally be axially aligned to allow complementary rotation of the upper stem 140 and the lower stem 204, respectively.

The upper neck 120 can comprise an upper neck flange 130 at the top end 126 in another aspect. Optionally, the upper neck flange 130 can define securing bores 132A-D (securing bore 132D shown in FIG. 4) extending through the upper neck flange 130 from a top side 134 of the upper neck flange 130 to a bottom side 136 of the upper neck flange 130. It is contemplated that the upper neck flange 130 can define a location at which an actuator system (not shown) can be mounted on the valve assembly 100 via the securing bores 132. For example and without limitation, a gear actuator system, lever actuator system, pneumatic actuator system, electric actuator system, or various other types of actuator systems can be mounted on the upper neck flange 130. The actuator system can be configured to rotate a disc 138 of the valve assembly 100 via the upper stem 140 between an open position, at which fluid can flow through the valve assembly 100, and a close position, at which the disc 138 forms a seal with the seat cover 108 to prevent the flow of fluid through the valve assembly 100. One skilled in the art will appreciate the number or shape of the securing bores 132 should not be considered limiting as it is contemplated that any number of securing bores 132, including zero securing bores 132, having any desired geometric shape can be present, and other known securing mechanisms can be used to secure the valve assembly 100 to the actuator system instead.

Optionally, the valve body 102 can comprise an upper portion 142 and a lower portion 144 secured together and in combination defining the annular features of the valve body 102, such as the inner surface 306. In this aspect, the upper portion 142 can comprise upper securing lugs 146A,B defining securing bores 206A,B (shown in FIG. 2) and the lower portion 144 can comprise lower securing lugs 148A,B defining securing bores 208A,B (shown in FIG. 2). Securing mechanisms, for example and without limitation nuts 150A,B and bolts 152A,B, can be utilized to secure the upper portion 142 to the lower portion 144 via the securing lugs 146,148. It is also contemplated that in other aspects, the upper portion 142 and the lower portion 144 can be integrally formed as a continuous valve body 102.

Referring to FIGS. 1-3, the valve assembly 100 can comprise the disc 138, the upper stem 140, and the lower stem 204. The disc 138 can be positioned within the body bore 218 and can define an outer edge 214 that is configured to engage and form a seal with an inner surface 216 of the seat cover 108 when the disc 138 is in the closed position. Optionally, the disc 138 can comprise an upper receiving portion 154 defining an upper disc opening 210 dimensioned to accommodate the upper stem 140 and a lower receiving portion 156 defining a lower disc opening 212 dimensioned to accommodate the lower stem 204. It is also contemplated that the disc 138 can comprise a single receiving portion defining a single opening extending through the disc 138 across a diameter of the disc 138 in other aspects. In these aspects, a single stem can optionally be utilized in place of the upper stem 140 and lower stem 204.

Optionally, the valve assembly 100 can comprise an upper O-ring 220A surrounding the upper stem 140 and a lower O-ring 220B surrounding the lower stem 204 to form seals between the disc 138, the stems 140,204, and the seat assembly 104, respectively. In another aspect, the valve assembly 100 optionally can comprise an upper bushing 222 surrounding the upper stem 140 within the upper neck bore 124 and a lower bushing 224 surrounding the lower stem 204 within the lower neck bore 202. In yet another aspect, the valve assembly 100 optionally can comprise a sealing mechanism such as a V-type packing ring 226, a bushing 228, and a wear shim 230. In one aspect, the packing ring 226, bushing 228, wear shim 230, and upper bushing 222 can be retained within the upper neck bore 124 through a connecting ring 232 and also through a securing rib 234 defined on the upper stem 140.

Figure 4:
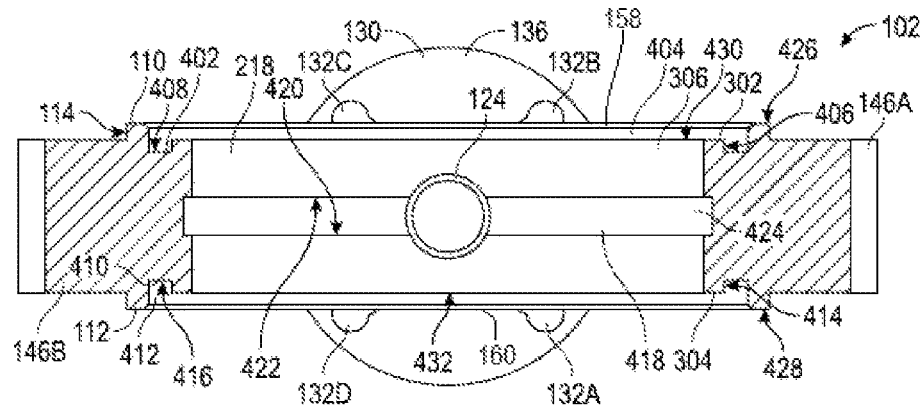
FIG. 4 is a sectional view of the valve body of the valve assembly of FIG. 1 taken along line 4-4 in FIG. 1.

Referring to FIG. 4, in one aspect, the outward front ridge 110 can define an outer front surface 426, the outward back ridge 112 can define an outer back surface 428, the inward front ridge 302 can define an inner front surface 430, and the inward back ridge 304 can define an inner back surface 432. The inner surface 306 can extend between the inner front surface 430 and the inner back surface 432. In one aspect, the valve body 102 can define a front groove 402 between the outward front ridge 110 and the inward front ridge 302. Optionally, the front groove 402 can comprise an inward-facing groove surface 404, a lower groove surface 406, and a side groove surface 408 extending from the inward-facing groove surface 404 to the outward-facing groove surface 406. Similarly, the valve body 102 can define a back groove 410 between the outward back ridge 112 and the inward back ridge 304. Optionally, the back groove 410 can comprise an inward-facing groove surface 412, an outward-facing groove surface 414, and a side groove surface 416 extending from the inward-facing groove surface 412 to the outward-facing groove surface 414. One having skill in the art will appreciate that the shape of the front groove 402 or the shape of the back groove 410 should not be considered limiting on the current disclosure as it is contemplated that any shape of the front groove 402 or the back groove 410 can be present.

In another aspect, the inner surface 306 can define a valve body groove 418 between the inward front ridge 302 and the inward back ridge 304. Optionally, the valve body groove 418 can comprise a first side surface 420, a second side surface 422, and a bottom groove surface 424 extending from the first side surface 420 to the second side surface 422. However, the shape of the valve body groove 418 should not be considered limiting on the current disclosure as it is contemplated that any shape of the valve body groove 418 can be present.

Referring to FIGS. 5-8, the seat 106 of the seat assembly 104 can comprise a body 502. In one aspect, the seat 106 can be constructed from a material that can be deformable but resilient and that can eliminate potential leak lines and enable a fluid tight seal to be formed between the seat assembly 104 and the valve body 102. For example and without limitation, it is contemplated that the seat 106 can be constructed from a material such as ethylene propylene diene monomer (EPDM) rubber, nitrile rubber (Buna-N), fluoroelastomers such as the material sold by E.I. du Pont de Nemours and Company (DuPont), Wilmington, Del. under the trade name VITON®, or any other suitable material. In various embodiments, integrally forming the various elements of the seat 106 eliminates potential leak lines and enables the valve assembly 100 to form a fluid tight seal.

The body 502 can comprise a front side 504 and a back side 506 distal from the front side 504. The body 502 can comprise an inner surface 508 extending from the front side 504 to the back side 506 and also an outer surface 510 extending from the front side 504 to the back side 506. In one aspect, the inner surface 508 defines a seat bore 512 extending from the front side 504 to the back side 506.

Optionally, the inner surface 508 can define a substantially cylindrical portion 514 between the front side 504 and the back side 506, a first angled portion 516 between the front side 504 and the substantially cylindrical portion 514, and a second angled portion 518 between the back side 506 and the substantially cylindrical portion 514. In this aspect, both the first angled portion 516 and the second angled portion 518 can be angled relative to an axis of the seat bore 512 and to the substantially cylindrical portion 514 such that the angled portions 516,518 are non-coannular with the substantially cylindrical portion 514, respectively. However, the shape of the inner surface 508 should not be considered limiting on the current disclosure as it is contemplated that the inner surface 508 can define various other shaped portions.

In one aspect, the body 502 can define an upper stem bore 520 and a lower stem bore 522 extending through the body 502 from the inner surface 508 to the outer surface 510. Optionally, the upper stem bore 520 can be defined in the body 502 at a position opposite of the position of the lower stem bore 522. The upper stem bore 520 and the lower stem bore 522 can be aligned with the upper neck bore 124 and the lower neck bore 202, respectively, of the valve body 102.

Figure 5:
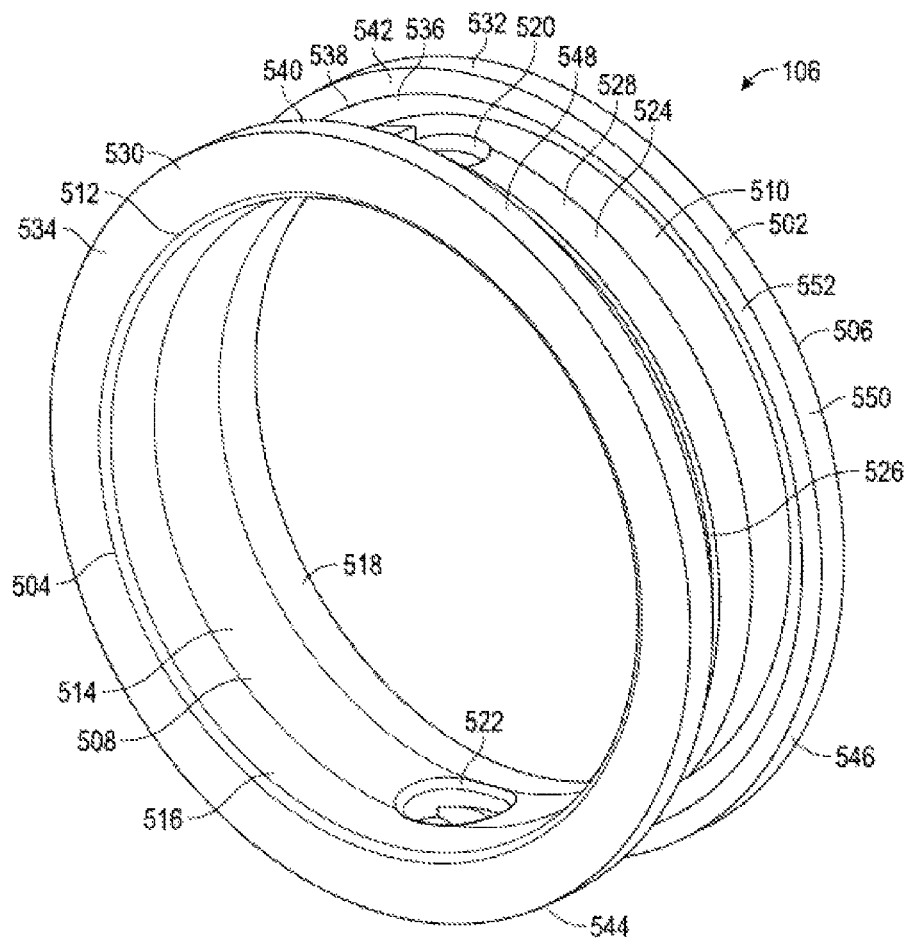
FIG. 5 is a perspective view of a seat of the seat assembly of FIG. 1.
Figure 6:
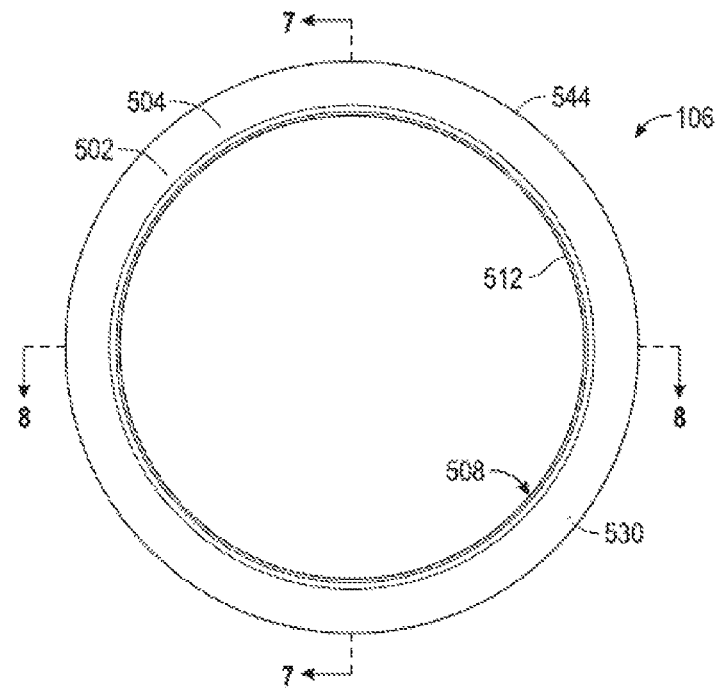
FIG. 6 is a front view of the seat of FIG. 5.
Figure 7:
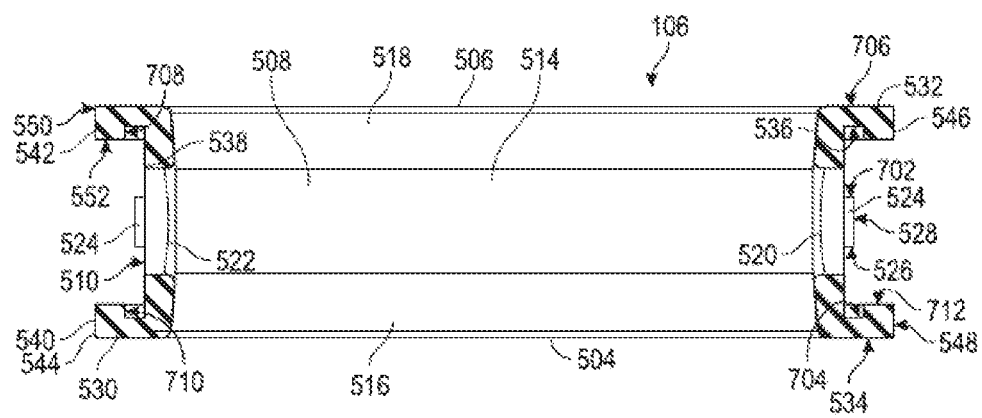
FIG. 7 is a sectional view of the seat of FIG. 5 taken along line 7-7 in FIG. 6.
Figure 8:
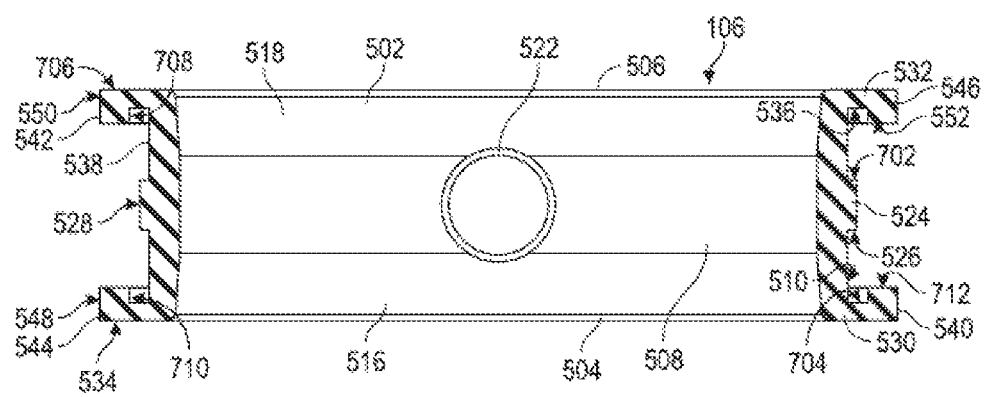
FIG. 8 is a sectional view of the seat of FIG. 5 taken along line 8-8 in FIG. 6.
Figure 9:
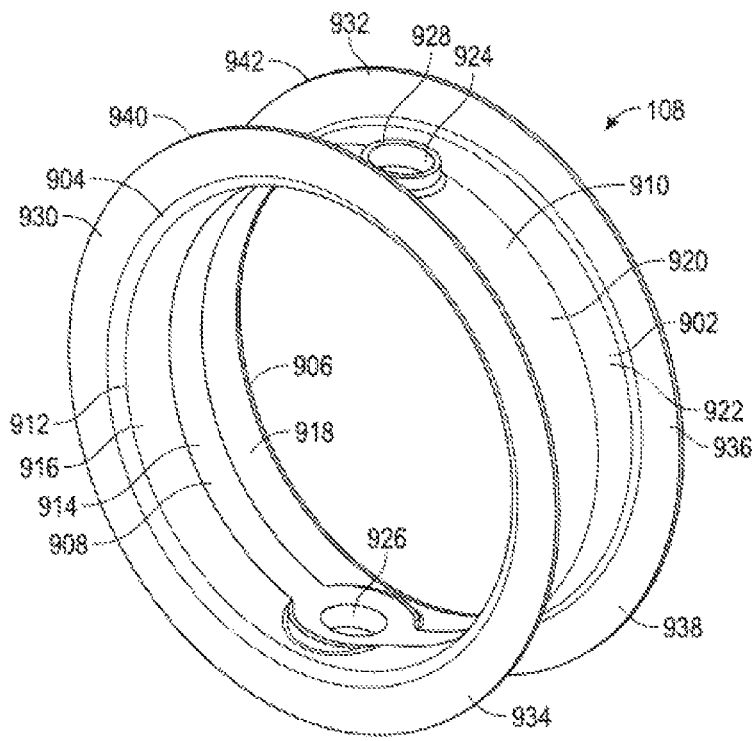
FIG. 9 is a perspective view of a seat cover of the seat assembly of FIG. 1.
Figure 10:
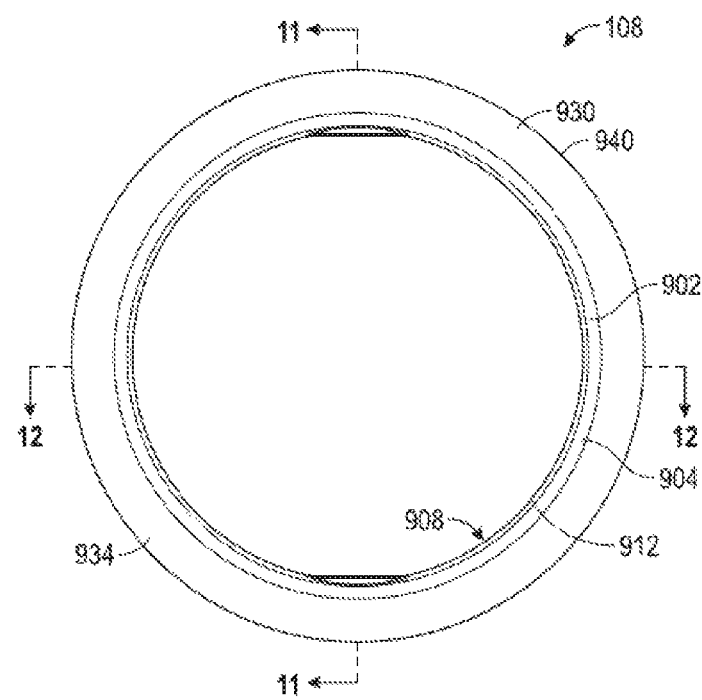
FIG. 10 is a front view of the seat cover of FIG. 9.
Figure 11:
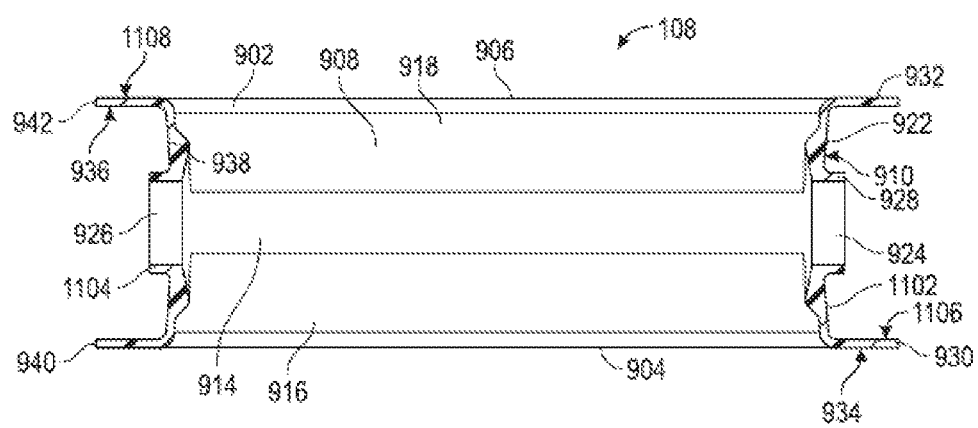
FIG. 11 is a sectional view of the seat cover of FIG. 9 taken along line 11-11 in FIG. 10.
Figure 12:
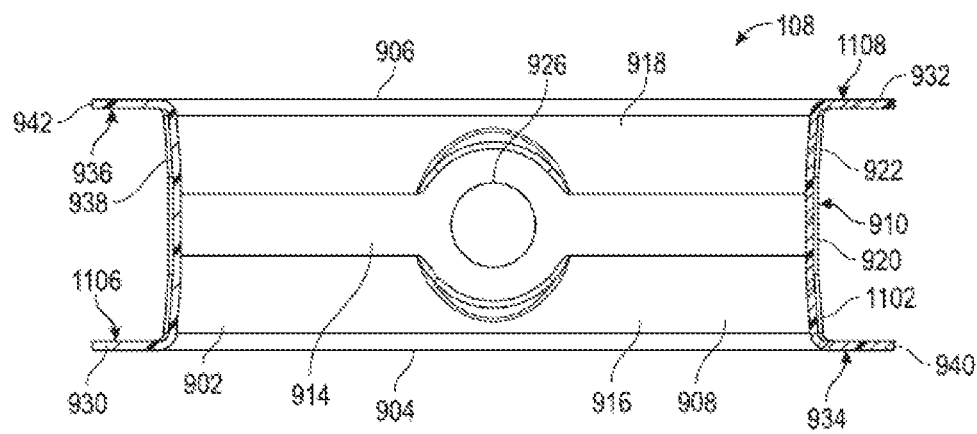
FIG. 12 is sectional view of the seat cover of FIG. 9 taken along line 12-12 in FIG. 10.
Figure 13:
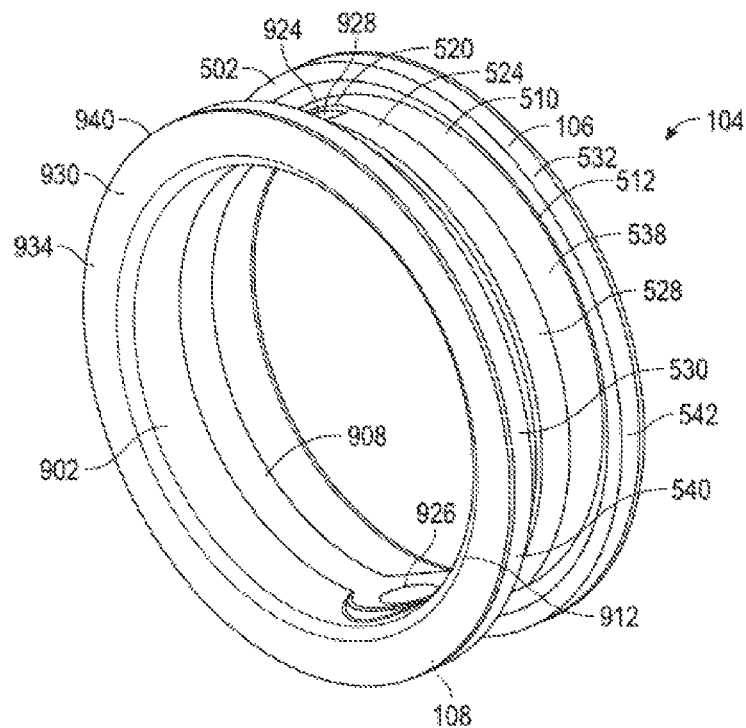
FIG. 13 is a perspective view of the seat assembly comprising the seat of FIG. 5 and the seat cover of FIG. 9.
Figure 14:
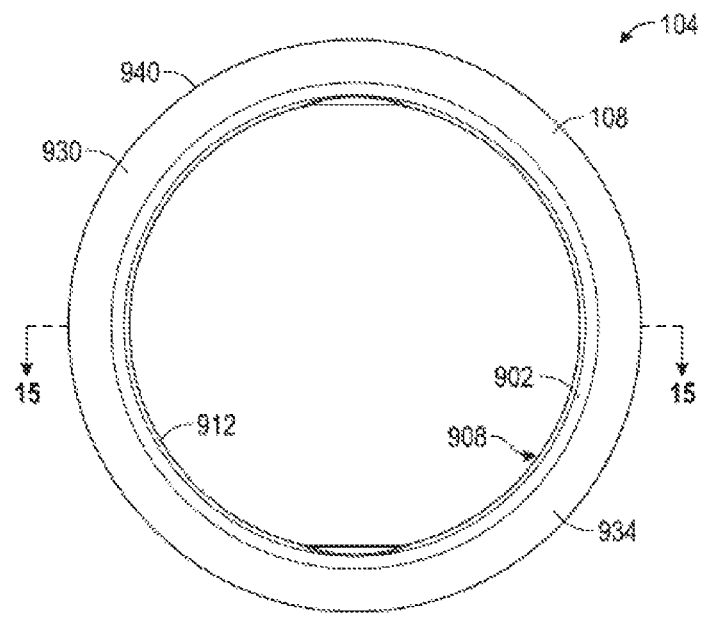
FIG. 14 is a front view of the seat assembly of FIG. 13.
Figure 15:
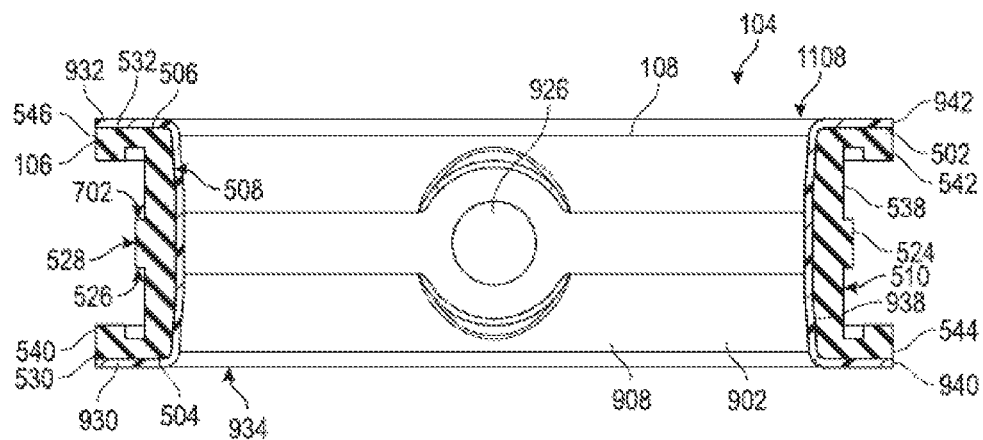
FIG. 15 is a sectional view of the seat assembly of FIG. 13 taken along line 15-15 in FIG. 14.
Figure 16:
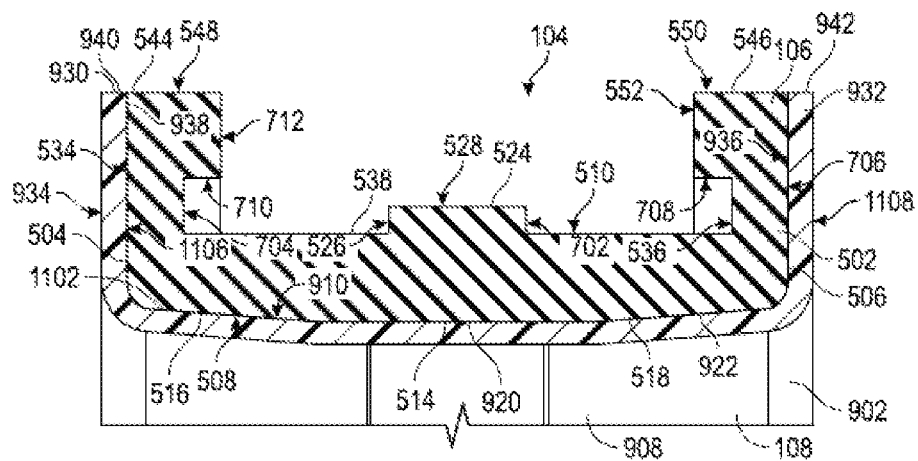
FIG. 16 is an enlarged sectional view of a portion of the seat assembly shown in FIG. 15.

In another aspect, the outer surface 510 can define a seat alignment rib 524 extending outwards in a radial direction from the outer surface 510 between the front side 504 and the back side 506. Optionally, the seat alignment rib 524 can define a first side surface 526, a second side surface 702 (shown in FIG. 7), and an outer surface 528 extending between the first side surface 526 and the second side surface 702. In this aspect, the seat alignment rib 524 can be dimensioned to be positioned within the valve body groove 418, as described in greater detail below. The shape of the seat alignment rib 524 should not be considered limiting on the current disclosure as it is contemplated that other geometric shapes of the seat alignment rib 524 can be present. Optionally, as shown in FIGS. 5 and 7, the upper stem bore 520 and the lower stem bore 522 can be defined through the seat alignment rib 524.

In yet another aspect, the body 502 can define a front flange 530 extending outwards in a radial direction from the outer surface 510 at the front side 504. Similarly, the body 502 can define a back flange 532 extending outwards in a radial direction from the outer surface 510 at the back side 506. The front flange 530 can comprise an outer surface 534 and an inner surface 704 (shown in FIG. 7) distal from the outer surface 534. The back flange 532 can comprise an outer surface 706 (shown in FIG. 7) and an inner surface 536 distal from the outer surface 706. In one aspect, the inner surface 704 of the front flange 530 can face the inner surface 536 of the back flange 532. In another aspect, the outer surface 510, the inner surface 536, and the inner surface 704 together can define a seat groove 538. In this aspect, the seat groove 538 can be configured to receive a seat engagement portion of the valve body 102 within the seat groove 538. In one aspect, the seat engagement portion of the valve body 102 can comprise the inward front ridge 302, the inward back ridge 304, the inner surface 306, the valve body groove 418, the front groove 402, and the back groove 410. The reception of the seat engagement portion of the valve body 102 within the seat groove 538 is described in greater detail below.

Optionally, the front flange 530 can define a front lip 540 extending inwards in an axial direction from the inner surface 704 of the front flange 530 at an outer end 544 of the front flange 530. In this aspect, the front lip 540 can extend inwards from the front flange 530 into the seat groove 538. In one aspect, the front lip 540 can comprise a top surface 548, a bottom surface 710 (shown in FIG. 7) distal from the top surface 548, and a side surface 712 (shown in FIG. 7) extending between the top surface 548 and the bottom surface 710. Similarly, the back flange 532 can define a back lip 542 extending inwards in an axial direction from the inner surface 536 of the back flange 532 at an outer end 546 of the back flange 532. In this aspect, the back lip 542 can extend inwards from the back flange 532 into the seat groove 538. The back lip 542 can comprise a top surface 550, a bottom surface 708 (shown in FIG. 7) distal from the top surface 550, and a side surface 552 extending between the top surface 550 and the bottom surface 708. One having skill in the art will appreciate that the shape of the front lip 540 or the shape of the back lip 542 should not be considered limiting on the current disclosure as it is contemplated that any shape of the front lip 540 or the back lip 542 can be present.

Referring to FIGS. 9-12, the seat cover 108 of the seat assembly 104 can comprise a body 902. The body 902 can comprise a front side 904 and a back side 906 distal from the front side 904. The body 902 can comprise an inner surface 908 extending from the front side 904 to the back side 906 and also an outer surface 910 extending from the front side 904 to the back side 906. In one aspect, the inner surface 908 defines a seat cover bore 912 extending from the front side 904 to the back side 906. It is contemplated that the seat cover 108 can be constructed from a material comprising polytetrafluoroethylene. For example, and without limitation, the seat cover 108 can be constructed from polytetrafluoroethylene sold by E.I. du Pont de Nemours and Company (DuPont), Wilmington, Del. under the trade name TEFLON®, or any other suitable material similar to polytetrafluoroethylene, such as or fluorinated ethylene propylene or fluoropolymers such as perfluoroalkoxy alkanes or other perfluoroethers, or other known materials having non-stick, non-corrosive, and/or non-reactive properties. In one aspect, constructing the seat cover 108 from a material comprising polytetrafluoroethylene or similar materials can render the valve assembly 100 suitable for food-grade applications or applications involving corrosive or caustic fluids.

Optionally, the inner surface 908 can define a substantially cylindrical portion 914 between the front side 904 and the back side 906, a first angled portion 916 between the front side 904 and the substantially cylindrical portion 914, and a second angled portion 918 between the back side 906 and the substantially cylindrical portion 914. In this aspect, both the first angled portion 916 and the second angled portion 918 can be angled relative to an axis of the seat cover bore 912 and to the substantially cylindrical portion 914 such that the angled portions 916,918 are non-coannular with the substantially cylindrical portion 914, respectively. Similarly, the outer surface 910 can optionally define a substantially cylindrical portion 920 between the front side 904 and the back side 906, a first angled portion 1102 (shown in FIG. 11) between the front side 904 and the substantially cylindrical portion 920, and a second angled portion 922 between the back side 960 and the substantially cylindrical portion 920. In this aspect, both the first angled portion 1102 and the second angled portion 922 can be angled relative to an axis of the seat cover bore 912 and to the substantially cylindrical portion 920 such that the angled portions 1102,922 are non-coannular with the substantially cylindrical portion 920, respectively. In one aspect, the substantially angled portions 1102,922 can be angled relative to the substantially cylindrical portion 920 of the seat cover 108 at an angle similar to that of the angled portions 516,518 relative to the substantially cylindrical portion of the inner surface 508 of the seat 106. However, the shape of the inner surface 508 or the shape of the outer surface 910 should not be considered limiting on the current disclosure as it is contemplated that the inner surface 908 or the outer surface 910 can define various other shaped portions.

In one aspect, the body 902 can define an upper stem bore 924 and a lower stem bore 924 extending through the body 902 from the inner surface 908 to the outer surface 910. Optionally, the upper stem bore 924 can be defined in the body 902 at a position opposite of the position of the lower stem bore 924 and can be aligned with the upper stem bore 520, the lower stem bore 522, the upper neck bore 124, the lower neck bore 202, respectively. In one aspect, the body 902 can define an upper stem guide 928 extending outwards from the outer surface 910 and surrounding the upper stem bore 924. Similarly, the body 902 can define a lower stem guide 1104 (shown in FIG. 11) extending outwards from the outer surface 910 and surrounding the lower stem bore 924. In one aspect, the upper stem guide 928 and the lower stem guide 1104 can be dimensioned such that the upper stem guide 928 can be positioned within the upper stem bore 520 of the seat 106 and the lower stem guide 1104 can be positioned within the lower stem bore 522 of the seat 106 when the seat cover 108 is mounted on the seat 106.

In yet another aspect, the body 902 can define a front flange 930 extending outwards in a radial direction from the outer surface 910 at the front side 904 to an outer end 940. Similarly, the body 902 can define a back flange 932 extending outwards in a radial direction from the outer surface 910 at the back side 906 to an outer end 942. The front flange 930 can comprise an outer surface 934 and an inner surface 1106 (shown in FIG. 11) distal from the outer surface 934. The back flange 932 can comprise an outer surface 1108 (shown in FIG. 11) and an inner surface 936 distal from the outer surface 1108. In one aspect, the inner surface 1106 of the front flange 930 can face the inner surface 936 of the back flange 932. In another aspect, the outer surface 910, the inner surface 936, and the inner surface 1106 together can define a seat cover groove 938. In this aspect, the seat cover groove 938 can be configured to receive the seat 106 within the seat cover groove 938, as described in greater detail below.

Referring to FIGS. 13-16, in one aspect, the seat cover 108 can be mounted on the seat 106 such that the seat 106 is positioned within the seat cover groove 938. In one aspect, the seat 106 is positioned in the seat cover groove 938 such that the front side 504 of the seat 106 and the front side 904 of the seat cover 108 are at the same side of the seat assembly 104 and the back side 506 of the seat 106 and the back side 906 of the seat cover 108 are at the same side of the seat assembly 104. In one aspect, the inner surface 508 of the seat 106 can be facing and can be in contact with the outer surface 910 of the seat cover 108. In this aspect, the substantially cylindrical portion 514 of the inner surface 508 of the seat 106 can be facing and can be in contact with the substantially cylindrical portion 920 of the outer surface 910 of the seat cover 108, the first angled portion 516 of the inner surface 508 of the seat 106 can be facing and can be in contact with the first angled portion 1102 of the outer surface 910 of the seat cover 108, and the second angled portion 518 of the inner surface 508 of the seat 106 can be facing and can be in contact with the second angled portion 922 of the outer surface 910 of the seat cover 108. In another aspect, the seat cover 108 can be molded over the seat 106. For example and without limitation, it is contemplated that molding the seat cover 108 over the seat 106 can comprise applying a polytetrafluoroethylene or similar coating to the surfaces 508,534,706 of the seat 106. The mechanism for attaching or mounting the seat cover 108 on the seat 106 should not be considered limiting on the current disclosure as it is contemplated that various other attachment mechanisms such as adhesives, press-fitting the seat 106 within the seat cover 108, or various other mechanisms can be utilized.

In another aspect, as described previously, the upper stem guide 926 of the seat cover 108 can be positioned within the upper stem bore 520 of the seat 106 and the lower stem guide 926 can be positioned within the lower stem bore 522 of the seat 106. In yet another aspect, the outer surface 534 of the front flange 530 of the seat 106 can be facing and can be in contact with the inner surface 1106 of the front flange 930 of the seat cover 108, and the outer surface 706 of the back flange 532 of the seat 106 can be facing and can be in contact with the inner surface 936 of the back flange 932 of the seat cover 108. In another aspect, the inner surface 908 of the seat cover 108 can be the innermost surface of the seat assembly 104 and the top surfaces 548,550 of the flanges 530,532 of the seat 106 can be the outermost surfaces of the seat assembly 104, respectively. In yet another aspect, the outer surface 934 of the front flange 930 of the seat cover 108 can be the most front-facing surface of the seat assembly 104 and the outer surface 1108 of the back flange 932 of the seat cover 108 can be the most back-facing surface of the seat assembly 104.

Figure 17:
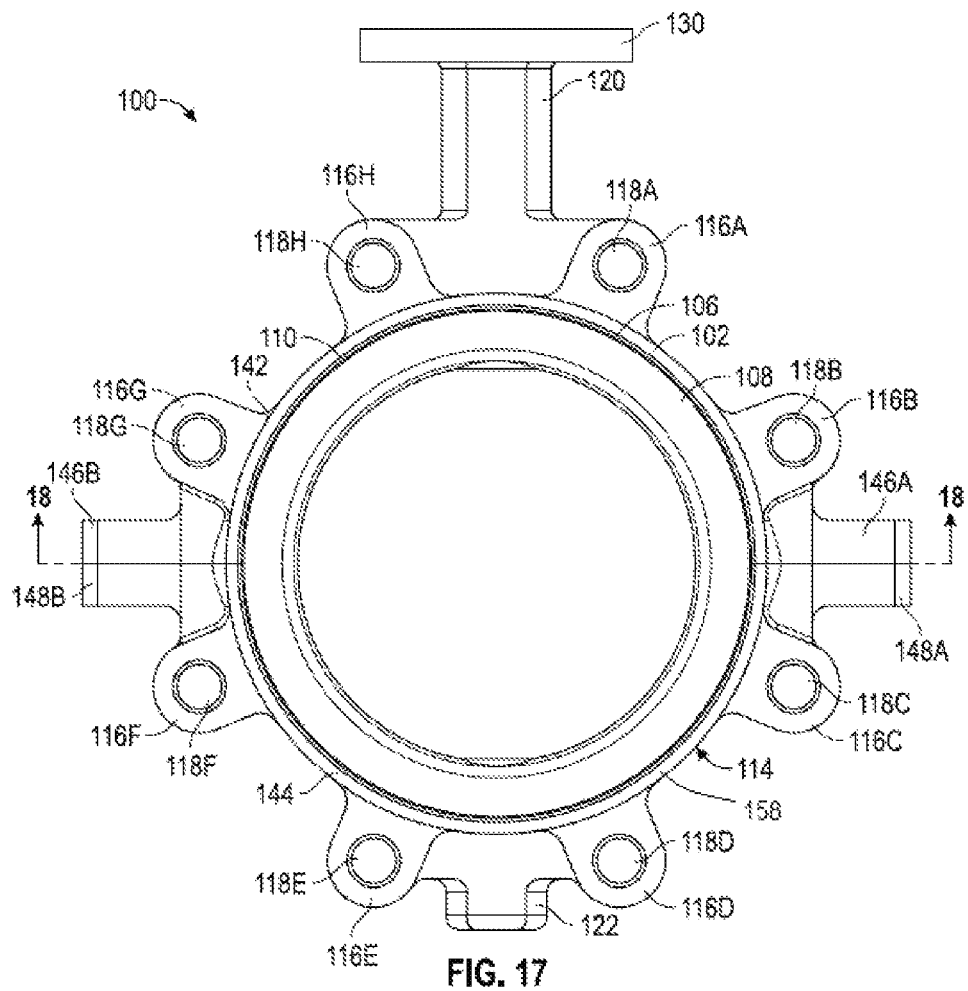
FIG. 17 is a front view of the seat assembly of FIG. 1 mounted within the valve body of FIG. 1.
Figure 18:
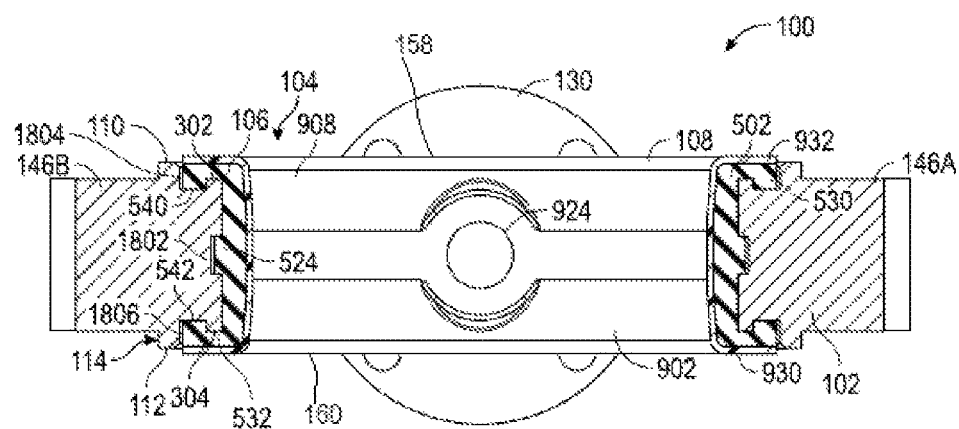
FIG. 18 is a sectional view of the seat assembly mounted within the valve body taken along line 18-18 in FIG. 17.
Figure 19:
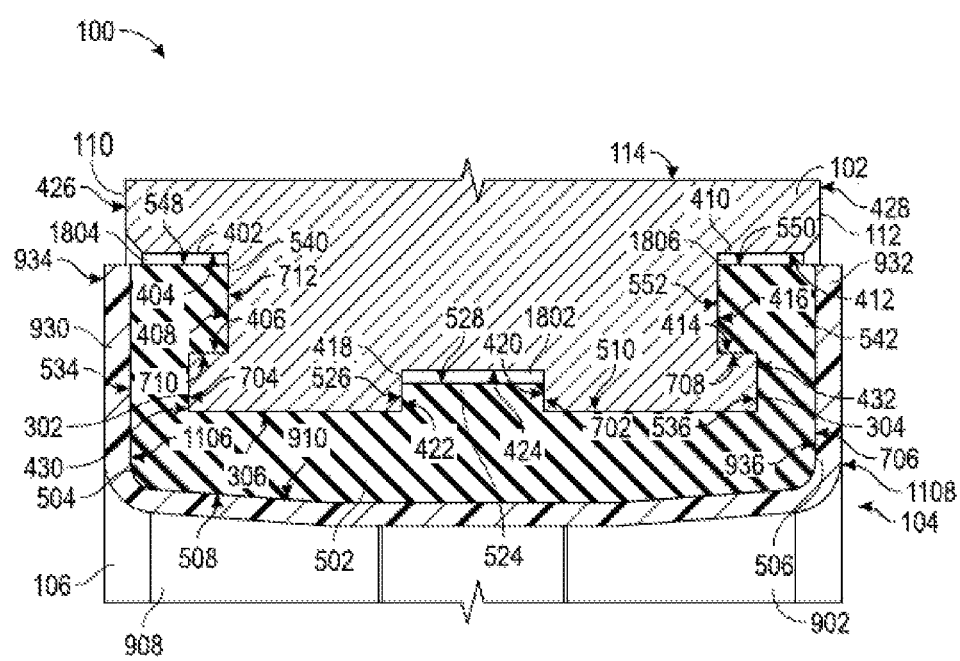
FIG. 19 is an enlarged sectional view of a portion of the seat assembly mounted within the valve body shown in FIG. 18.

Referring to FIGS. 17-19, in one aspect, the seat assembly 104 can be mounted on the valve body 102. In this aspect, at least a portion of the seat assembly 104 can be mounted within the body bore 218. In another aspect, at least a portion of the valve body 102 can be mounted within the seat groove 538.

In one aspect, the inner surface 306 can be facing and in contact with the outer surface 510 of the seat 106. In another aspect, the seat alignment rib 524 of the seat 106 can be positioned in and substantially fill the valve body groove 418 of the valve body 102. In this aspect, the first side surface 420 of the valve body groove 418 can be facing and in contact with the first side surface 526 of the seat alignment rib 524 and the second side surface 422 of the valve body groove 418 can be facing and in contact with the second side surface 702 of the seat alignment rib 524. In one aspect, the seat alignment rib 524 positioned within the valve body groove 418 can define a deformation gap 1802 between the bottom groove surface 424 of the valve body groove 418 and the outer surface 528 of the seat alignment rib 524. In this aspect, the bottom groove surface 424 can be facing the outer surface 528 but spaced apart from the outer surface 528 to define the deformation gap 1802. Optionally, in another aspect, the front groove 402 can define a front deformation gap 1804 between the inward-facing groove surface 404 and the top surface 548 of the front lip 540 of the seat 106. Similarly, the back groove 410 can define a back deformation gap 1806 between the inward facing groove surface 412 and the top surface 550 of the back lip 542 of the seat 106.

In another aspect, the inner surface 704 of the front flange 530 of the seat 106 can be facing and in contact with the inner front surface 430 of the valve body 102 and the inner surface 536 of the back flange 532 of the seat 106 can be facing and in contact with the inner back surface 432 of the valve body 102. In yet another aspect, the front lip 540 can be positioned within the front groove 402 of the valve body 102 and the back lip 542 can be positioned within the back groove 410 of the valve body 102. In this aspect, the bottom surface 710 of the front lip 540 of the seat 106 can be facing and in contact with the outward-facing groove surface 406 of the front groove 402 of the valve body 102 and the bottom surface 708 of the back lip 542 of the seat 106 can be facing and in contact with the outward-facing groove surface 414 of the back groove 410 of the valve body 102. In another aspect, the side surface 712 of the front lip 540 of the seat 106 can be facing and in contact with the side groove surface 408 of the front groove 402 of the valve body 102 and the side surface 552 of the back lip 542 of the seat 106 can be facing and in contact with the side groove surface 416 of the back groove 410 of the valve body 102. The inward-facing groove surface 412 of the back groove 410 of the valve body 102 can be facing and in contact with the top surface 550 of the back lip 542 of the seat 106. The inward-facing groove surface 404 of the front groove 402 of the valve body 102 can be facing and in contact with the top surface 548 of the front lip 540 of the seat 106.

In one aspect, it is contemplated that by having the seat 106 inserted into the valve body 102 with nothing between the seat 106 and the valve body 102, a fluid tight seal is formed and potential leak lines are minimized, thus reducing the possibility of failure of the fluid tight seal. This configuration can further reduce the need for additional elements, which would otherwise increase the number of potential leak lines, while providing a reduction in the operating torque. For example and without limitation, the deformation gap 1802 can allow the seat 106 to be compressed into the valve body groove 418, such as during cycling of the valve assembly 100. In this aspect, the operating torque for cycling the valve assembly 100 can be reduced. It is also contemplated that positioning the seat alignment rib 524 within the valve body groove 418 can aid in locking the seat assembly 104 in place on the valve body 102. It is further contemplated that locking the seat assembly 104 in place on the valve body 102 can substantially prevent radial movement and axial movement of the seat assembly 104 relative to the valve body 102. It is also contemplated that positioning the front lip 540 within the front groove 402 and positioning the back lip 542 within the back groove 410 can also aid in locking the seat assembly 104 in place on the valve body 102 and can form a seal between the seat 106 and the valve body 102 extending an entire length of the respective grooves 402,410,418. In another aspect, the seat cover 108 constructed from the material comprising polytetrafluoroethylene or similar material can enable the valve assembly 100 to be utilized in food-grade settings or settings involving caustic or corrosive materials. In yet another aspect, the seat cover 108 constructed from the material comprising polytetrafluoroethylene or similar material can aid in reducing or minimizing the torque needed to open and close the disc 138 during use of the valve assembly 100.

In various embodiments, the inner surface 306 of the valve body 102 can be in full contact with the seat 106 except for deformation gap 1802. In various embodiments, nothing fills the deformation gap 1802 defined between the outer surface 528 of the seat alignment rib 524 and the bottom groove surface 424 of the valve body groove 418. By having the seat 106 inserted into the body 102 with nothing between the seat 106 and the body 102, a fluid tight seal can be formed and potential leak lines are minimized, thus reducing the possibility of failure of the fluid tight seal. This configuration further reduces the need for additional elements, which would otherwise increase the number of potential leak lines, while providing a reduction in the operating torque, as described below. However, it is also contemplated that inner surface 306 may not be in full contact with the seat 106 or another element can be placed at some point between the seat 106 and the body 102, depending on the circumstances.

In a further aspect, a method of manufacturing the valve assembly 100 is provided. In one aspect, the method can comprise forming the valve body 102, such as by casting or machining. The method can also comprise forming the seat 106, such as by injection molding or machining.

In one aspect, the method can comprise mounting the seat cover 108 on the seat 106 such that the seat 106 is positioned within the seat cover groove 938. In one aspect, mounting the seat cover 108 on the seat 106 can comprise molding the seat cover 108 on the seat 106 by applying a polytetrafluoroethylene or similar coating to the surfaces 508,534,706 of the seat 106. However, the mechanism for attaching or mounting the seat cover 108 on the seat 106 should not be considered limiting on the current disclosure as it is contemplated that various other attachment mechanisms such as adhesives, press-fitting the seat 106 within the seat cover 108, or various other mechanisms can be utilized to mount the seat cover 108 on the seat 106.

In another aspect, the method can comprise mounting the seat 106 on the valve body 102 by positioning the seat 106 at least partially within the body bore 218 and positioning a portion of the valve body 102 within the seat groove 538. It is contemplated that mounting the seat 106 on the valve body 102 can be performed before mounting the seat cover 108 on the seat 106 or after mounting the seat cover 108 on the seat 106.

In one aspect, the step of mounting the seat 106 on the valve body 102 can comprise positioning the seat alignment rib 524 within the valve body groove 418 of the valve body 102. In another aspect, the step of mounting the seat 106 on the valve body 102 can comprise positioning the front lip 540 of the seat 106 within the front groove 402 of the valve body 102 and positioning the back lip 542 of the seat 106 within the back groove 410 of the valve body 102. Optionally, positioning the back lip 542 within the back groove 410 and positioning the front lip 540 within the front groove 402 can be accomplished by bending the seat 106.

The method can further comprise positioning the disc 138 within the seat cover bore 912 defined by the seat cover 108. In another aspect, the method can comprise aligning the upper stem bore 520 of the seat, the upper stem bore 924 of the seat cover 108, and the upper neck bore 124 of the valve body 102. The method can further comprise aligning the lower stem bore 522 of the seat 106, the lower stem bore 924 of the seat cover 108, and the lower neck bore 202 of the valve body 102. In another aspect, the method can comprise inserting the upper stem 140 through the upper neck bore 124 of the valve body 102, the upper stem bore 520 of the seat 106, and the upper stem bore 924 of the seat cover 108 and into the upper disc opening 210 of the disc 138. The method can further comprise inserting the lower stem 204 through the lower neck bore 202 of the valve body 102, the lower stem bore 522 of the seat 106, and the lower stem bore 924 of the seat cover 108 and into the lower disc opening 212 of the disc 138. The method can further comprise securing an actuator system to the valve assembly 100 and engaging the actuator system with the upper stem 140. As one non-limiting example, it is contemplated that the actuator system can be secured to the upper neck flange 130 via the securing bores 132 and corresponding fasteners such that the actuator system is engaged with the upper stem 140.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A valve assembly comprising:
    a valve body comprising
        an inner surface and an outer surface, the inner surface defining a body bore,
        an inward front ridge and an inward back ridge distal from the inward front ridge, and
        an outward front ridge and an outward back ridge distal from the inward front ridge,
        wherein the valve body defines a front groove between the outward front ridge and the inward front ridge and a back groove between the outward back ridge and the inward back ridge, the inner surface defining a valve body groove between the inward front ridge and the inward back ridge, the valve body groove having a bottom groove surface, the inward front ridge of the valve body defining an inner front surface, the inner front surface orthogonal to and intersecting a lower groove surface of the front groove and orthogonal to and intersecting the inner surface of the valve body, the valve body further defining a chamfer at an intersection between an inward-facing groove surface of the front groove and an outer front surface of the outward front ridge; and
    a seat comprising
        a front side,
        a back side distal from the front side,
        an inner surface defining a seat bore,
        an outer surface defining a seat alignment rib, the seat alignment rib extending outward in a radial direction with respect to the seat bore from the outer surface of the seat between the front side and the back side, the seat alignment rib comprising an outer surface, the seat mounted on the valve body with the outer surface of the seat facing the inner surface of the valve body and with the seat alignment rib positioned in the valve body groove, the valve body groove defining a first deformation gap between the bottom groove surface and the outer surface of the seat alignment rib, the first deformation gap intersecting an upper stem bore and a lower stem bore of the body,
        a front flange extending outwards in a radial direction with respect to the seat bore from the outer surface of the seat at the front side, the front flange of the seat comprising an inner surface and an outer surface, and
        a front lip positioned in the front groove of the valve body, the front lip defining a top surface, a bottom surface, and a side surface extending between the top surface and the bottom surface, the side surface orthogonal to and intersecting each of the top surface and the bottom surface; and
    a seat cover comprising
        a front side,
        a back side distal from the front side,
        an inner surface defining a seat cover bore,
        an outer surface, the seat cover mounted on the seat with the outer surface of the seat cover facing and contacting the inner surface of the seat,
        a front flange extending outwards in a radial direction with respect to the seat cover bore from the outer surface of the seat cover at the front side, and
        a back flange extending outwards in the radial direction with respect to the seat cover bore from the outer surface of the seat cover at the back side,
        wherein the outer surface of the front flange of the seat faces and contacts the inner surface of the front flange of the seat cover, an outer end of the front flange of the seat cover aligned with an outer end of the front flange of the seat, the outer end of the front flange of the seat cover and the outer end of the front flange of the seat together defining a single cylindrical surface, the outward front ridge of the valve body and the cylindrical surface defining a front deformation gap therebetween.

2. The valve assembly of claim 1, wherein the seat cover comprises polytetrafluoroethylene.

3. The valve assembly of claim 1, wherein the front flange of the seat cover comprises an inner surface and an outer surface, wherein the back flange of the seat cover comprises an inner surface and an outer surface, and wherein the outer surface of the seat cover and the inner surfaces of the front flange and the back flange of the seat cover together define a seat cover groove receiving the seat within the seat cover groove.

4. The valve assembly of claim 3, wherein the seat further comprises:
    a back flange extending outwards in the radial direction with respect to the seat bore from the outer surface of the seat at the back side, the back flange of the seat comprising an inner surface and an outer surface, the outer surface of the back flange of the seat facing the inner surface of the back flange of the seat cover,
    wherein the outer surface of the seat and the inner surfaces of the front flange and the back flange of the seat together define a seat groove receiving the valve body within the seat groove.

5. The valve assembly of claim 1, wherein the seat cover covers the inner surface of the seat.

6. The valve assembly of claim 1, wherein the outer surface of the seat cover contacts the inner surface of the seat.

7. The valve assembly of claim 1, wherein the seat cover defines a stem guide extending outwards in a radial direction with respect to the seat cover bore from the outer surface of the seat cover, and wherein the seat cover defines a stem bore extending through the stem guide and the seat cover from the inner surface to a top surface of the stem guide.

8. The valve assembly of claim 1, wherein the inner surface of the seat cover comprises a substantially cylindrical portion facing radially inward and an angled portion, and wherein the outer surface of the seat cover comprises a substantially cylindrical portion facing radially outward and an angled portion.

9. The valve assembly of claim 1, wherein the seat alignment rib is configured to elastically deform into each portion of the deformation gap that intersects the upper stem bore or the lower stem bore.

10. A valve assembly comprising:
    a valve body comprising
        an inner surface and an outer surface, the inner surface defining a body bore,
        an inward front ridge and an inward back ridge distal from the inward front ridge, and
        an outward front ridge and an outward back ridge distal from the inward front ridge;
    a seat comprising
        a front side,
        a back side distal from the front side,
        an inner surface defining a seat bore,
        an outer surface defining a seat alignment rib extending outward in a radial direction from the outer surface between the front side and the back side, the seat alignment rib comprising an outer surface,
        a front flange extending outwards in the radial direction from the outer surface of the seat at the front side, the front flange of the seat comprising an inner surface, an outer surface, and an outer end distal from the outer surface of the seat,
        a front lip positioned in the front groove of the valve body, the front lip extending inwards in an axial direction from the inner surface at the outer end, the front lip defining a top surface, a bottom surface, and a side surface extending between the top surface and the bottom surface, the side surface orthogonal to and intersecting each of the top surface and the bottom surface; and
        a back flange extending outwards in the radial direction from the outer surface of the seat at the back side; and
    a seat cover comprising
        a front flange extending outwards in a radial direction with respect to the seat cover bore at a first axial end and comprising an outer surface facing axially outward, and
        a back flange distal from the front flange, the back flange of the seat cover extending outwards in a radial direction with respect to the seat cover bore at a second axial end and comprising an outer surface facing axially outward,
        wherein the outer surface of each of the front flange of the seat cover and the back flange of the seat cover are continuously flat in cross-section from the inner surface of the body of the seat cover and extending outwards in the radial direction, an outer end of the front flange of the seat cover aligned with an outer end of the front flange of the seat and an outer end of the back flange of the seat cover aligned with an outer end of the back flange of the seat, the outer end of the front flange of the seat cover and the outer end of the front flange of the seat together defining a single cylindrical surface, the cylindrical surface being a first cylindrical surface, the valve body defining a second cylindrical surface facing but offset from the first cylindrical surface, the first cylindrical surface extending axially beyond an axial end of the valve body, the valve body defining a chamfer at an intersection between the second cylindrical surface and the outer front surface of the outward front ridge, the inner surface defining a seat cover bore, the seat cover mounted on the seat with the outer surface of the seat cover facing the inner surface of the seat; the seat cover also comprising polytetrafluoroethylene, the polytetrafluoroethylene of the seat cover being in contact with the seat.

11. The valve assembly of claim 10, wherein the back flange of the seat cover comprises an inner surface and an outer surface, and wherein the outer surface of the seat cover and the inner surfaces of the front flange of the seat cover and the back flange of the seat cover together define a seat cover groove receiving the seat within the seat cover groove.

12. The valve assembly of claim 11, wherein:
    the outer surface of the front flange is distal from the inner surface of the front flange of the seat, the outer surface of the front flange of the seat facing the inner surface of the front flange of the seat cover; and
    the back flange of the seat comprises:
        an outer end distal from the outer surface of the seat,
        an inner surface,
        an outer surface distal from the inner surface, the outer surface of the back flange of the seat facing the inner surface of the back flange of the seat cover, and
        a back lip extending inwards in an axial direction from the inner surface at the outer end and towards the front lip.

13. The valve assembly of claim 10, wherein the inner surface of the body of the seat cover comprises a first tapered surface and a second tapered surface, the first tapered surface extending inward from and intersecting the outer surface of the front flange of the body of the seat cover and the second tapered surface extending inward from and intersecting the outer surface of the back flange of the body of the seat cover, the first tapered surface and the second tapered surface facing at least partially radially inward, a portion of the inner surface that is flat in cross-section extending from the first tapered surface to the second tapered surface in a direction parallel to the axial direction.

14. A method of manufacturing a valve assembly, the method comprising:
    forming a valve body comprising
        an inner surface, the inner surface defining a valve body bore, the inner surface defining a valve body groove between an inward front ridge and an inward back ridge of the valve body, the valve body groove having a bottom groove surface,
        an outward front ridge, and
        an outward back ridge distal from the inward front ridge,
        wherein the valve body defines a front groove between the outward front ridge and the inward front ridge, the inward front ridge of the valve body defining an inner front surface, the inner front surface orthogonal to and intersecting a lower groove surface of the front groove and orthogonal to and intersecting the inner surface of the valve body;

forming a seat comprising an outer surface defining a seat alignment rib extending outward in a radial direction from the outer surface of the seat between a front side and a back side of the seat, the seat alignment rib comprising an outer surface;

forming a front flange having a lip at a front side of the seat, the front flange extending outwards in a radial direction with respect to the seat bore from-the outer surface of the seat at the front side, the front flange of the seat comprising an inner surface and an outer surface, the seat further comprising a front lip positioned in the front groove of the valve body, the front lip defining a top surface, a bottom surface, and a side surface extending between the top surface and the bottom surface, the side surface orthogonal to and intersecting each of the top surface and the bottom surface;

mounting a seat cover on the seat, the seat positioned within a seat cover groove defined by the seat cover, the seat cover comprising a body, the body defining an inner surface facing radially inward, the body comprising a front flange and a back flange, the front flange extending outwards in a radial direction at a first axial end of the body and comprising an outer surface facing axially outward, the back flange extending outwards in a radial direction at a second axial end of the body and comprising an outer surface facing axially outward, the outer surface of each of the front flange and the back flange being continuously flat in cross-section from the inner surface of the body of the seat cover and extending outwards in the radial direction;

aligning an outer end of the front flange of the seat cover with an outer end of the front flange of the seat, the outer end of the front flange of the seat cover and the outer end of the front flange of the seat together defining a single cylindrical surface, the outward front ridge of the valve body and the cylindrical surface defining a front deformation gap therebetween, the cylindrical surface being a first cylindrical surface, the valve body defining a second cylindrical surface facing but offset from the first cylindrical surface, the first cylindrical surface extending axially beyond an axial end of the valve body, the valve body defining a chamfer at an intersection between the second cylindrical surface and the outer front surface of the outward front ridge;

positioning the seat and seat cover at least partially within the valve body bore; and positioning the seat alignment rib into the valve body groove to define a deformation gap between the bottom groove surface and the outer surface of the seat alignment rib, the deformation gap intersecting an upper stem bore and a lower stem bore of the body.

15. The method of claim 14, further comprising:
positioning a rotatable disc within a seat cover bore defined by the seat cover; and
inserting a stem through a stem bore defined by the valve body, a stem bore defined by the seat, a stem bore defined by the seat cover, and into a disc opening defined by the rotatable disc.

16. The method of claim 14, wherein mounting the seat cover on the seat comprises molding the seat cover around the seat.

17. The method of claim 14, further comprising:
forming a front side groove in the valve body between an outward front ridge and the inward front ridge of the valve body;
forming a back side groove in the valve body between an outward back ridge and the inward back ridge of the valve body;
forming a back flange having a lip at a back side of the seat, the back flange extending radially outwards from the outer surface of the seat;
positioning the lip of the front flange of the seat within the front side groove of the valve body; and
positioning the lip of the back flange of the seat within the back side groove of the valve body.

18. The method of claim 14, wherein mounting the seat on the seat cover further comprises aligning a stem bore defined by the seat cover with a stem bore defined by the seat.

19. The method of claim 14, wherein the inner surface of the body of the seat cover comprises a first tapered surface and a second tapered surface, the first tapered surface extending inward from and intersecting the outer surface of the front flange of the body of the seat cover and the second tapered surface extending inward from and intersecting the outer surface of the back flange of the body of the seat cover, the first tapered surface and the second tapered surface facing at least partially radially inward, a portion of the inner surface that is flat in cross-section extending from the first tapered surface to the second tapered surface in a direction parallel to the axial direction.

20. The method of claim 14, further comprising elastically deforming the seat alignment rib into the deformation gap such that the seat alignment rib also deforms into each portion of the deformation gap that intersects the upper stem bore or the lower stem bore.

21. A valve assembly comprising:
a valve body comprising
an inner surface and an outer surface, the inner surface defining a body bore,
an inward front ridge and an inward back ridge distal from the inward front ridge,
an outward front ridge and an outward back ridge distal from the inward front ridge,
wherein the valve body defines a front groove between the outward front ridge and the inward front ridge and a back groove between the outward back ridge and the inward back ridge, the inner surface defining a valve body groove between the inward front ridge and the inward back ridge, the valve body groove having a bottom groove surface, the inward front ridge of the valve body defining an inner front surface, the inner front surface orthogonal to and intersecting a lower groove surface of the front groove and orthogonal to and intersecting the inner surface of the valve body;
a seat comprising
a front side,
a back side distal from the front side,
an inner surface defining a seat bore,
an outer surface defining a seat alignment rib, the seat alignment rib extending outward in a radial direction with respect to the seat bore from the outer surface of the seat between the front side and the back side, the seat alignment rib comprising an outer surface, the seat mounted on the valve body with the outer surface of the seat facing the inner surface of the valve body and with the seat alignment rib positioned in the valve body groove, the valve body groove defining a first deformation gap between the bottom groove surface and the outer surface of the seat alignment rib, the first deformation gap intersecting an upper stem bore and a lower stem bore of the body, a front flange extending outwards in a radial direction with respect to the seat bore from the outer surface of the seat at the front side, the front flange of the seat comprising an inner surface and an outer surface, and a front lip positioned in the front groove of the valve body, the front lip defining a top surface, a bottom surface, and a side surface extending between the top surface and the bottom surface, the side surface orthogonal to and intersecting each of the top surface and the bottom surface; and a seat cover comprising
  a front side,
  a back side distal from the front side,
  an inner surface defining a seat cover bore,
  an outer surface, the seat cover mounted on the seat with the outer surface of the seat cover facing and contacting the inner surface of the seat,
  a front flange extending outwards in a radial direction with respect to the seat cover bore from the outer surface of the seat cover at the front side, and
  a back flange extending outwards in the radial direction with respect to the seat cover bore from the outer surface of the seat cover at the back side, wherein the outer surface of the front flange of the seat faces and contacts the inner surface of the front flange of the seat cover, an outer end of the front flange of the seat cover aligned with an outer end of the front flange of the seat, the outer end of the front flange of the seat cover and the outer end of the front flange of the seat together defining a single cylindrical surface, the outward front ridge of the valve body and the cylindrical surface defining a front deformation gap therebetween; wherein the cylindrical surface is a first cylindrical surface, the valve body defining a second cylindrical surface facing but offset from the first cylindrical surface, the first cylindrical surface extending axially beyond an axial end of the valve body, the valve body defining a chamfer at an intersection between the second cylindrical surface and the outer front surface of the outward front ridge.

\* \* \* \* \*